United States Patent
Nocon et al.

(10) Patent No.: US 11,090,806 B2
(45) Date of Patent: Aug. 17, 2021

(54) SYNCHRONIZED ROBOT ORIENTATION

(71) Applicant: Disney Enterprises, Inc., Burbank, CA (US)

(72) Inventors: Nathan D. Nocon, Valencia, CA (US); Michael P. Goslin, Sherman Oaks, CA (US); Clifford Wong, Burbank, CA (US); Jonathan RD Hsu, Pomona, CA (US); Timothy M. Panec, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 357 days.

(21) Appl. No.: 16/104,493

(22) Filed: Aug. 17, 2018

(65) Prior Publication Data

US 2020/0055186 A1 Feb. 20, 2020

(51) Int. Cl.
 *G05B 19/18* (2006.01)
 *B25J 9/16* (2006.01)
 *B25J 11/00* (2006.01)

(52) U.S. Cl.
 CPC ........... *B25J 9/1664* (2013.01); *B25J 11/008* (2013.01)

(58) Field of Classification Search
 CPC .... B25J 9/1664; B25J 11/008; B25J 11/0035; B25J 11/003; B25J 11/0015; B25J 11/001; B25J 11/0005; B25J 9/1694; G05D 1/0297; G05B 2219/39163
 USPC ................................. 700/245, 248–254, 262
 See application file for complete search history.

(56) References Cited

U.S. PATENT DOCUMENTS

| | | | |
|---|---|---|---|
| 2007/0260394 A1* | 11/2007 | Dean | G01C 21/00 701/408 |
| 2010/0164960 A1* | 7/2010 | Asami | A63F 13/10 345/473 |
| 2014/0231590 A1* | 8/2014 | Trowbridge | A63H 27/12 244/175 |
| 2014/0233099 A1* | 8/2014 | Stark | G09F 21/14 359/446 |
| 2014/0249693 A1* | 9/2014 | Stark | B64D 47/02 701/2 |
| 2016/0059145 A1* | 3/2016 | Cortelyou | A63J 5/025 472/57 |
| 2017/0069214 A1* | 3/2017 | Dupray | G08G 5/0013 |
| 2018/0253093 A1* | 9/2018 | Augugliaro | G05D 1/0202 |
| 2019/0050269 A1* | 2/2019 | Anderson | B25J 9/1617 |
| 2019/0107845 A1* | 4/2019 | Kaine | G05D 1/0022 |
| 2019/0143527 A1* | 5/2019 | Favis | B25J 13/003 700/264 |
| 2019/0369641 A1* | 12/2019 | Gillett | G05D 1/0088 |
| 2020/0004235 A1* | 1/2020 | Nocon | A63H 30/04 |
| 2020/0007384 A1* | 1/2020 | Mueck | H04L 43/50 |
| 2020/0036609 A1* | 1/2020 | Nocon | B25J 9/0084 |

* cited by examiner

*Primary Examiner* — B M M Hannan
(74) *Attorney, Agent, or Firm* — Patterson + Sheridan, LLP

(57) ABSTRACT

Systems, methods and articles of manufacture for synchronized robot orientation are described herein. A magnetometer, gyroscope, and accelerometer in a remotely controlled device are used to determine a current orientation of that device, and a command with a specified orientation or location are set to several such devices. The remotely controlled devices self-align based on the specified orientation/location, and when in position, receive swarm commands to perform actions as a group of devices in coordination with one another.

20 Claims, 12 Drawing Sheets

SYNCHRONIZED ROBOT ORIENTATION

BACKGROUND

The remote manipulation and control of devices via radio-transmitted commands relies on the controller being able to coordinate between remotely controlled devices. When several devices are present in the environment, each device may be associated with an individual controller, and the control thereof may rely on several users coordinating activities with one another to coordinate the associated devices.

SUMMARY

The present disclosure provides, in one embodiment, a method for synchronized robot orientation, comprising: receiving, at a given bot in a plurality of robotic devices, a swarm command, the swarm command including a specified orientation and a specified location; determining a current orientation of the given robotic device in an environment, based at least in part on a magnetometer indicating an alignment deviation of the given robotic device from a magnetic field direction and an accelerometer and a gyroscope indicating an alignment of the given robotic device relative to gravity; determining a current location of the given robotic device relative to a reference point in the environment; in response to determining that at least one of the current orientation of the given robotic device does not match the specified orientation and the current location of the given robotic device does not match the specified location, adjusting a position of the given robotic device to affect at least one of the current orientation and the current location.

The present disclosure provides, in another embodiment, a computer program product for synchronizing robot orientation, the computer-readable program code comprising: a computer-readable storage medium having computer-readable program code that when executed by a processor, enable the processor to: receive, at a given bot in a plurality of robotic devices, a swarm command, the swarm command including a specified orientation and a specified location; determine a current orientation of the given robotic device in an environment, based at least in part on a magnetometer indicating an alignment deviation of the given robotic device from a magnetic field line; determine a current location of the given robotic device relative to a reference point in the environment; in response to determining that at least one of the current orientation of the given robotic device does not match the specified orientation and the current location of the given robotic device does not match the specified location, adjust a position of the given robotic device to affect at least one of the current orientation and the current location.

The present disclosure provides, in a further embodiment, a system enabled to synchronize orientation with other systems in a swarm of such systems, comprising: a radio; an accelerometer; a gyroscope; a magnetometer; a motor; a processor; a memory, including instructions that when executed by the processor, enable the system to: receive, via the radio, a swarm command, the swarm command including a specified orientation and a specified location for the system and other systems in a swarm; determine a current orientation of the system in an environment, based at least in part on the magnetometer indicating an alignment deviation of the system from a magnetic field line; determining a current location of the system relative to a reference point in the environment; in response to determining that at least one of the current orientation of the system does not match the specified orientation and the current location of the system does not match the specified location, adjusting a position of the system, via the motor, to affect at least one of the current orientation and the current location.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The coordinated orientation and control of remote controlled devices is provided herein. Several remoted controlled devices, that are part of a swarm of n devices, may be signaled to individually determine an orientation and location in the shared environment and adjust individual positions in the environment so that every device in the swarm coordinates movements to thereby synchronize how the individual devices in the swarm are oriented and where the individual devices are located.

Figure 1B:
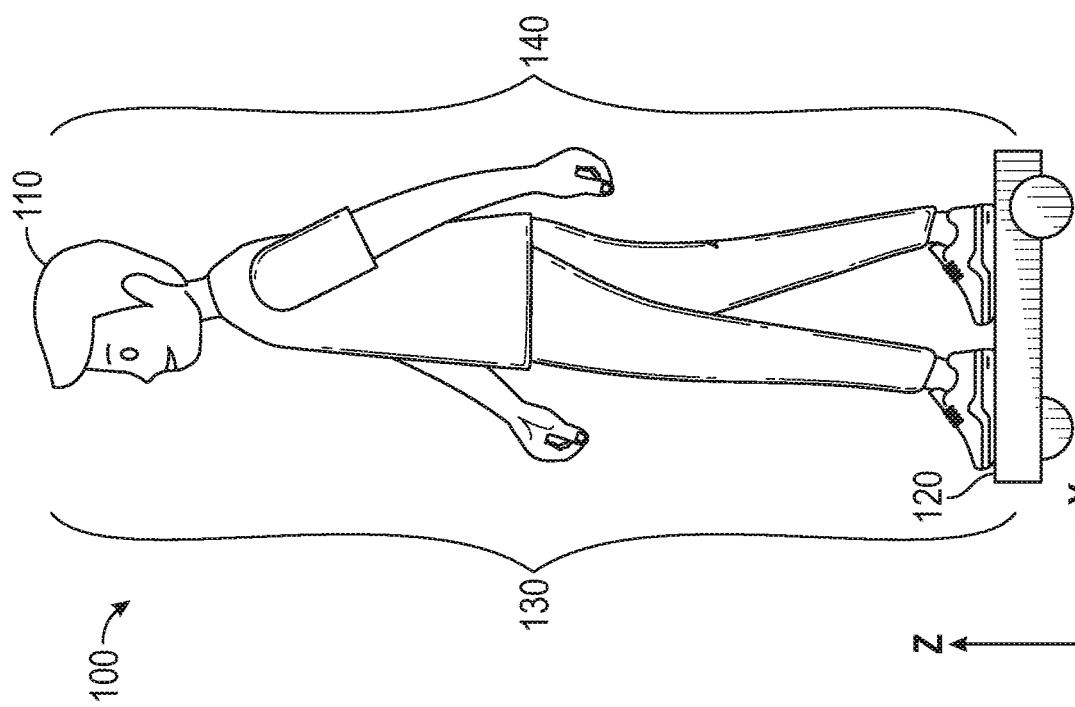
FIGS. 1A-C illustrate example remotely controlled devices according to aspects of the present disclosure.
Figure 1A:
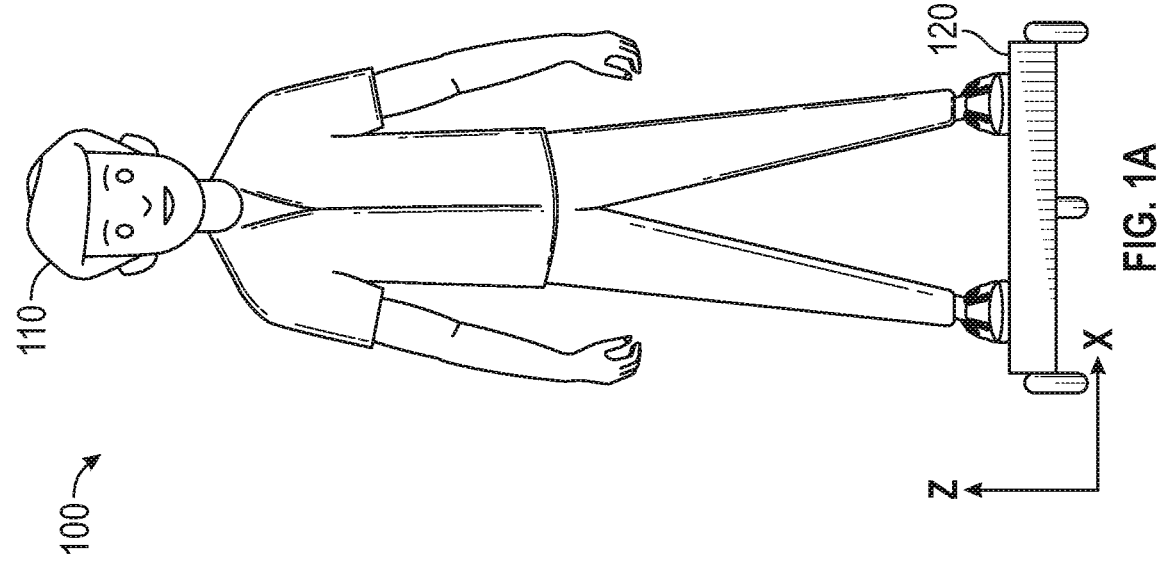

Referring now to FIGS. 1A and 1B, two views of an example remote controlled device of a robotic action figure are shown. A robotic action figure may generally or collectively be referred to herein as a bot 100, bots 100, or bots 100n. Specific examples of a bot 100 may be distinguished from one another by various titles and postscripts after the associated element number (e.g., first bot 100a, second bot 100b).

Each bot 100 described herein includes a top 110, a base 120, a front 130, and a back 140. These descriptors of the bot 100 are defined in reference to the given bot 100 being described, and may vary from bot 100 to bot 100. For example, a user may hold a given bot 100 upside-down, with the base 120 above the top 110 without altering which portion of the bot 100 is considered the top 110 or the base 120. In another example, a bot 100 may have a top 110 defined at a position other than illustrated highest position (in the Z axis) shown in FIGS. 1A and 1B, such as when the arms of the bot 100 are raised above the top 110.

The base 120 provides the bot 100 with locomotive force, such as through one or more drive wheels capable of imparting locomotion to the bot 100, with the remaining wheels being free wheels. Although the example bot 100 shown in FIGS. 1A and 1B is mounted on a base 120 with three wheels, in other embodiments, a base 120 may use more or fewer than three wheels and in different arrangements than illustrated. In some embodiments, the base 120 may include rolling surfaces other than wheels (e.g., balls, skids, tracks) and may incorporate casters or rack/pinion interfaces to steer the movement of the bot 100. In various embodiments, the base 120 may omit wheels entirely, such as when the bot 100 uses two sets of tracks, a serpentine crawl for locomotion, uses legs for locomotion, is configured for use in water (and uses a propeller, jet, sails, or swimming motion for locomotion), is configured for use in flight (and uses a lifting gas or lifting surface and propellers or jets for locomotion), etc.

The front 130 and the back 140 designate opposite sides of the bot 100. In some embodiments the front 130 may occupy more or less than 180 degrees of the perimeter of the bot 100 (and the back 140, correspondingly, may occupy less or more than 180 degrees), and the front 130 and the back 140 may be sub-divided into various regions (e.g., front-left, front-center, front-right) around the perimeter of the bot 100. In some embodiments, the front 130 and the back 140 of the bot 100 may be defined relative to the head of the bot 100. In various embodiments, the bot 100 is defined to have a face (e.g., with eyes, nose mouth, etc.) to represent a well-known character, animal, or archetype from a movie, television show, play, story, or real-life. Although the illustrated bot 100 is humanoid in appearance, other body forms are contemplated (robots, horses, elephants, dragons, cars, aircraft, ships, spaceships, etc.), which may have faces or other features that define a front for the bot 100. For example, the bow of a ship may define the front 130 for a bot 100 designed to resemble that ship, while the face of a cartoon character may define the front 130 for an associated bot 100. In embodiments in which the head may swivel independently of the rest of the bot 100 (e.g., on a neck), another feature may be designated to define which side of the bot 100 is the front 130.

Figure 1C:
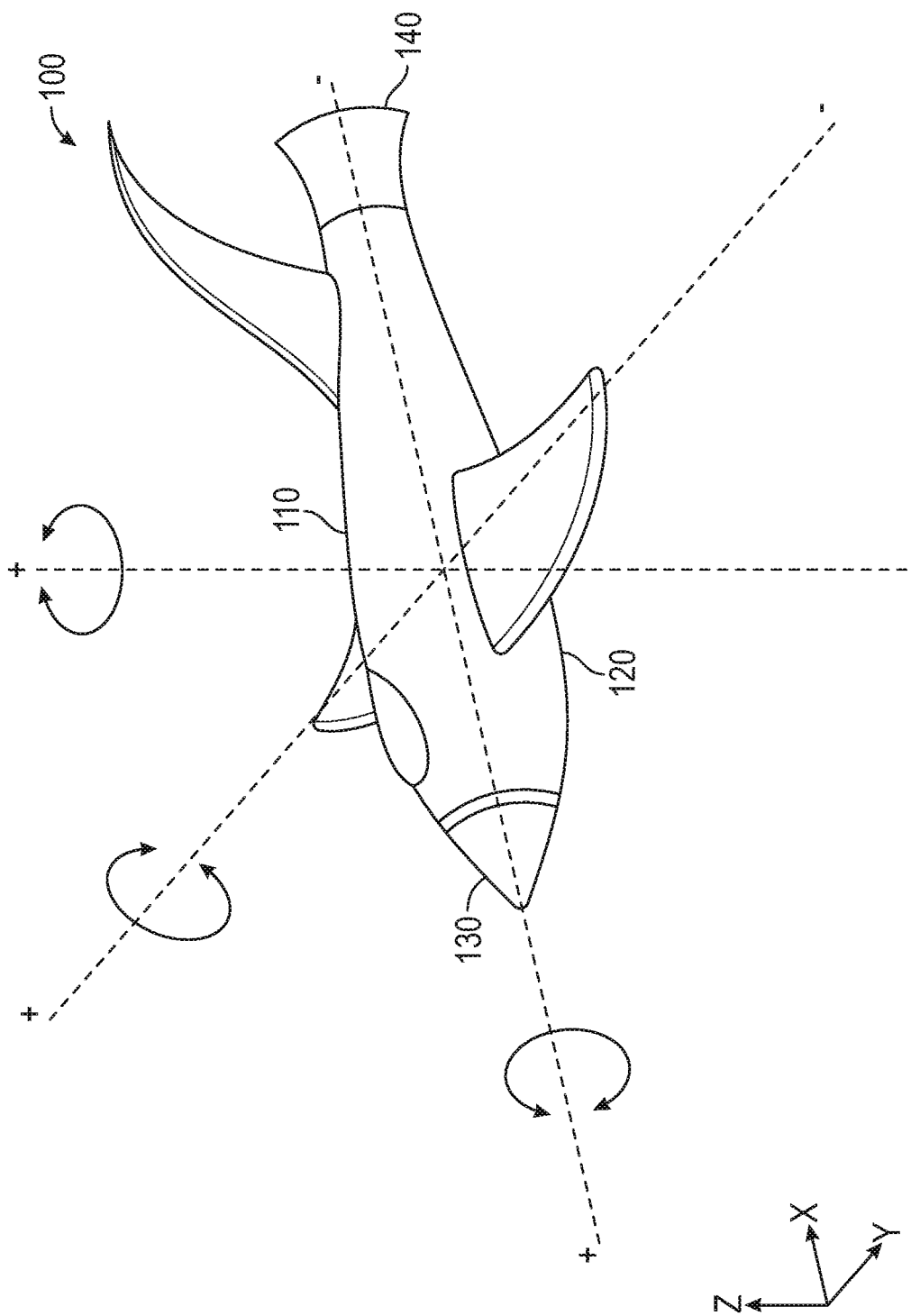

FIG. 1C illustrates one view of an example remotely controlled device of a drone resembling a rocket-ship, which is another example of a bot 100. A drone style bot 100 may move in several planes (e.g., flying through the air, submerging/surfacing in water), and FIG. 1C illustrates several concepts related to movement, navigation, and control of a bot 100. Although Cartesian coordinates are used to describe the motion of the bot 100, other coordinate systems may be used with internal or external references points (relative to the bot 100) in other embodiments.

A longitudinal axis runs from the front 130 of the bot 100 to the back 140 of the bot 100, and motion along the longitudinal axis may be classified as forward (positive) or backward (negative) along the longitudinal axis. Rotation about the longitudinal axis is referred to as roll.

A transverse axis runs from one side of the bot 100 to the other side of the bot 100, and motion along the transverse axis may be classified as leftward (negative) or rightward (positive). Rotation about the transverse axis is referred to as pitch.

A vertical axis runs from the top 110 of the bot 100 to the base 120 of the bot 100, and motion along the vertical axis may be classified as upward (positive) or downward (negative). Rotation about the vertical axis is referred to as yaw.

The longitudinal, transverse, and vertical axes are independent of the environmental X, Y, and Z axes used to map space in the environment. The bot 100 may track location and orientation in the environment via a tuple of X, Y, Z, yaw, pitch, and roll values. As used herein, the 6-tuple defines the position of the bot 100 in the environment, whereas the 3-tuple of (X,Y,Z) defines the location of the bot 100 in the environment, and the 3-tuple of (yaw, pitch, roll) defines the orientation of the bot 100 in the environment. The individual values in this 6-tuple may be based on a change relative to an initial starting position in the environment, one or more points of orientation in the environment, and combinations thereof. For example, the bot 100 may track pitch values relative to the visible horizon or an internal level/gyroscope; Z values relative to sea level, a starting altitude, an altitude relative to what is currently beneath the base 120 of the bot 100; X and Y values relative to a distance traveled from a starting point, a latitude/longitude; etc.

Orientation may be tracked in various vectors relative to the environment. For example, the accelerometer 222 and gyroscope 223 may provide one or more bearings or vectors by which pitch and/or roll, relative to gravity, are calculated. In another example, the magnetometer 221 may provide a vector or bearing by which yaw, relative to magnetic north, is calculated.

Figure 2:
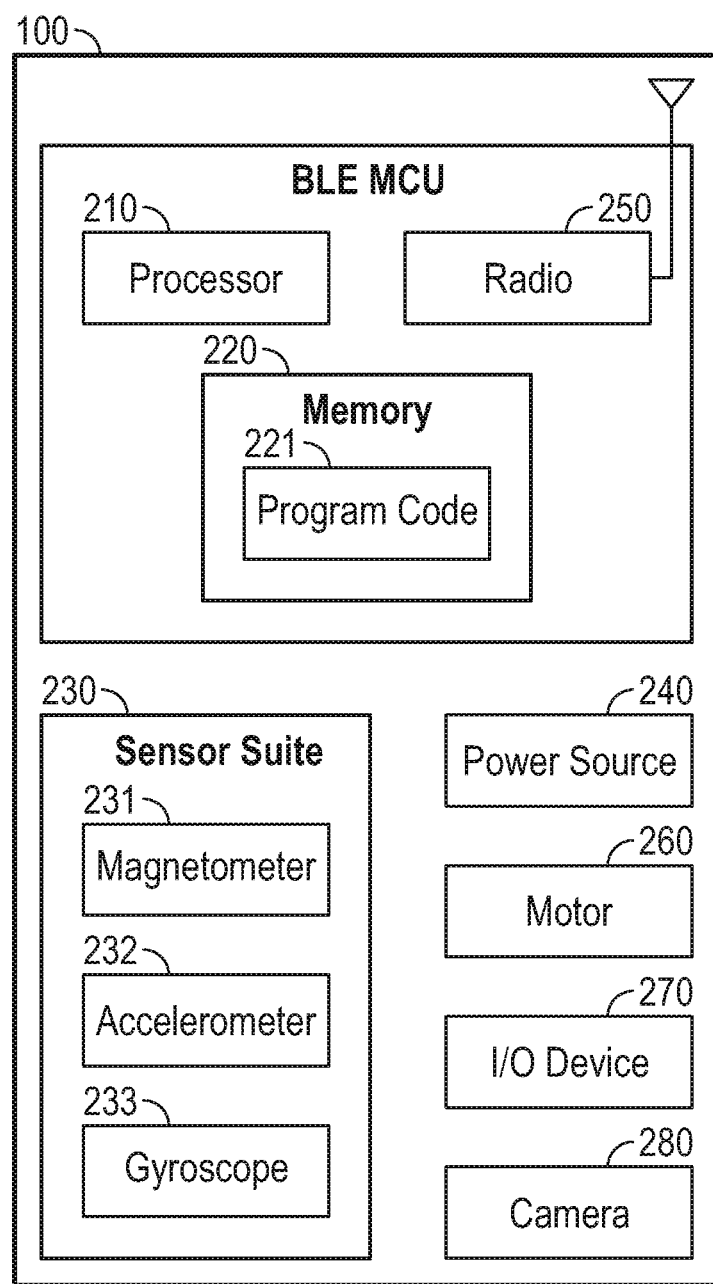
FIG. 2 is a block diagram of the internal components of a remotely controlled device according to aspects of the present disclosure.

FIG. 2 is a block diagram of the internal components of a robotic action figure. The internal components of a given bot 100 may vary from those illustrated in FIG. 2, and several instances of each component may be included in a given bot 100. The internal components include a processor 210, a memory 220, a sensor suite 230, a power source 240, a motor 250, a radio 250, and may include other input or output (I/O) devices 270 (e.g. LED, IR transmitter/receivers, speaker, buttons, microphones, light sensors, etc.).

The processor 210 and the memory 220 provide computing functionality to the bot 100. The memory 220 may be one or more memory devices, such as, for example, Random Access Memory (RAM), Read Only Memory (ROM), flash memory, or any other type of volatile or non-volatile storage medium that includes instructions that the processor 210 may execute to affect the bot 100. The processor 210, which may be any computer processor capable of performing the functions described herein, executes commands included in the instructions, which may include performing certain tasks in response to signals received via the sensor suite 230 or the radio 250.

The memory 220 generally includes program code 221 for performing various functions related operating the bot 100. The program code 221 is generally described as various functional "applications" or "modules" within the memory 220, although alternate implementations may have different functions and/or combinations of functions. Within the memory 220, the program code 221 is generally configured to control the bot 100 in relation to commands from one or more users.

The sensor suite 230 may include a magnetometer 231, an accelerometer 232, and a gyroscope 233. The magnetometer 231 is a sensor that provides a bearing to a north pole of a magnetic field in the environment in which the bot 100 is present. The magnetometer 231 may thus provide the bot 100 with a directional sense in terms of yaw orientation with respect to magnetic north. The accelerometer 232, which measures acceleration forces acting on the bot 100, may provide the bot 100 with information of whether the bot 100 (or a portion of the bot 100) is moving, and in which direction(s). The gyroscope 233 measures orientation of the bot (or a portion of the bot 100), and may provide the bot 100 with information of whether the bot 100 (or portion of the bot 100) is level (e.g., whether the bot 100 is standing or has been knocked over). The combination of the accelerometer and gyro may thus provide the bot 100 with a direction sense in terms of pitch and roll with respect to gravity. The magnetometer 231 may be described as providing yaw information on the orientation of the bot 100 (e.g., how many degrees from north the front 130 is oriented), while the accelerometer 222 and gyroscope 233 provide information related to the pitch and roll of the orientation of the bot 100.

The sensor suite 230 may include additional sensors, several instances of each sensor, or may omit some of the example sensors discussed herein. For example, a bot 100 may include an infrared emitter and/or receiver to identify objects within the environment. In another example, the bot 100 may include a laser range finder sensor to determine a distance to an object from the bot 100 in the environment. In a further example, the bot 100 may include a camera sensor including image recognition software to identify objects within the environment and/or provide an image to a user from the perspective of the bot 100.

The power source 240 provides electric power to the various components of the bot 100. Various examples of power sources 240 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 240.

The radio 250 provides wireless communications for the bot 100. In some embodiments, the radio 250 is a receiver, which receives signals from external sources to inform how the bot 100 is to behave. In other embodiments, the radio 250 is a transmitter/receiver, which receives signals from external sources to inform how the bot 100 is to behave, and transmits signals to external devices (e.g., other bots 100, a paired controller for the bot 100). The radio 250 may be in communication with various antennas and may configure messages to be transmitted or received according to various standards, such as, Bluetooth Low Energy (BLE) or a proprietary standard.

The motors 260 included in the bot 100 are provided for locomotion and/or actuation of the bot 100. In an example, a motor 260 connected with a drive wheel in the base 120 of the bot 100 may induce the bot 260 to move forward, in reverse, and/or turn left or right. In a third example, a motor 260 connected as a pinion with a rack that is connected with one or more wheels may induce the bot 100 to steer when locomotion is supplied by another motor 260. In various embodiments, the motors 260 are electrical motors that are selectively provided power from the power source 240 based on instructions executed but the processor 210. The motors 260 may provide locomotive force, actuation of various portions of the bot 100 (e.g., arms, legs, hands, necks), and/or vibration (e.g., rotating an off-centered weight). In some embodiments, the motors 260 include positional sensors to provide the processor 210 with information related to a rotational position affected by the motor 260 (e.g., rotated d degrees from a reference point).

The I/O devices 270 may include various lights, displays, and speakers (e.g. LEDs, IR transmitter/receivers, speaker, buttons, microphones, light sensors, etc.) for providing output from the bot 100 in addition to that provided by the motors 250 and/or radio 250. For example, a Light Emitting Diode (LED) is an I/O device 270 that provides an visual effect for the bot 100 when certain actions are performed by the bot 100. In another example, a speaker is an I/O device 270 that provides audio output (e.g., of a sound effect or voice recording) when certain actions are performed by the bot 100.

Figure 3:
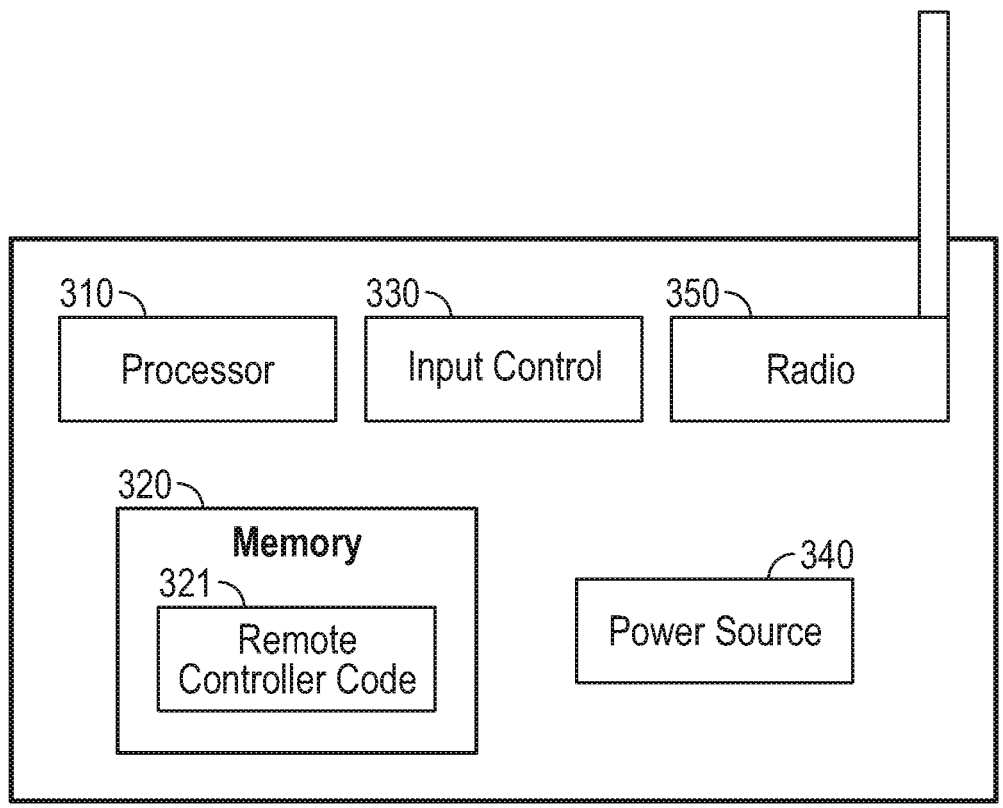
FIG. 3 illustrates an example Remote Control (RC) for use with a remotely controlled device according to aspects of the present disclosure.

FIG. 3 illustrates an example Remote Control (RC) for use with a robotic action figure. A remote control may generally or collectively be referred to herein as an RC 300, RCs 300, or RCs 300n. Specific examples of an RC 300 may be distinguished from one another by various titles and postscripts after the associated element number (e.g., first RC 300a, second RC 300b). Each RC 300 may be primarily keyed to control one bot 100, and when specific examples of paired RC 300 and bots 100 are given herein, the given titles and subscripts for the given bot 100 and RC 300 will match. For example, Alex may control a first bot 100a using a first RC 300a, whereas Blake may control a second bot 100b using a second RC 300b, and Charlie may control a third bot 100c using a third RC 300c. When providing swarm commands, according to aspects discussed herein, a user may control n bots 100n with one RC 300, as each bot 100 is able to self-orient to perform synchronized actions.

The processor 310 and the memory 320 provide computing functionality to the RC 300. The memory 320 may be one or more memory devices, such as, for example, Random Access Memory (RAM), Read Only Memory (ROM), flash memory, or any other type of volatile or non-volatile storage medium that includes instructions that the processor 310 may execute to affect the bot 100 via the RC 300. The processor 310, which may be any computer processor capable of performing the functions described herein, executes commands based on inputs received from the input controls 330. In some embodiments, the memory 320 may queue instructions for transmission to the bot 100.

The memory 320 generally includes program code for performing various functions related operating the RC 300. The program code is generally described as various functional "applications" or "modules" within the memory 320, although alternate implementations may have different functions and/or combinations of functions. Within the memory 320, the remote controller code 321 is generally configured to provide functionality to remotely control the bot 100 in relation to commands from one or more users. In some embodiments, the remote controller code 321 is provided to manage inputs from a purpose-built RC 300 (i.e., a dedicated remote control), while in other embodiments the remote controller code 321 is provided to enable a general computing device (e.g., a smart phone, a tablet computer, a laptop computer) to provide control signals to a bot 100.

The RC 300 includes one or more input controls 330 to receive input from a user to thereby control the bot 100 at a distance. The input controls 330 may include physical joysticks, physical steering wheels/yokes, physical buttons, physical switches, and a touch interface that designates various regions for use as virtual joysticks, buttons, switches, etc. A user may manipulate the various input controls 330 to signal that the bot 100 is to perform a desired action (e.g., move forward, play an audio clip, steer to the right, raise an arm, twist), which the processor 320 may interpret and transmit to the bot 100 via the radio 350.

The power source 340 provides electric power to the various components of the RC 300. Various examples of power sources 340 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 340.

The radio 350 provides wireless communications for the RC 300. In some embodiments, the radio 350 is a transmitter, which transmits signals to external devices (e.g., bots 100) to inform how a bot 100 is to behave. In other embodiments, the radio 250 is a transmitter/receiver, which receives signals from external sources (e.g., bots 100 and other RCs 300) to inform how a given bot 100 or RC 300 is behaving, and transmits signals to external devices. The radio 350 may be in communication with various antennas and may configure messages to be transmitted or received according to various standards, such as, BLE or a proprietary standard.

Figure 4:
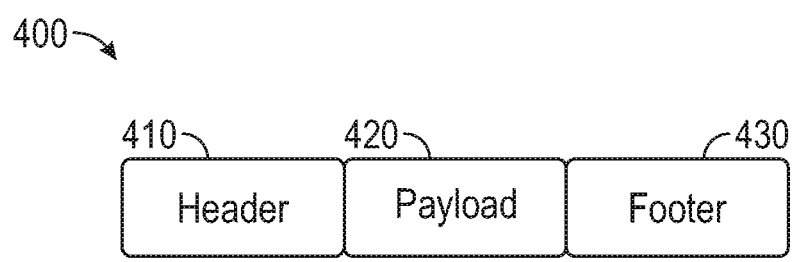
FIG. 4 illustrates an example packet which may be used in various embodiments according to aspects of the present disclosure.

FIG. 4 illustrates an example packet 400 which may be used in various embodiments. The packet 400 represents a formatting for data that are transmitted between a bot 100 and an RC 300. The packet 400 includes a header 410, a payload 420, and a footer 430. The data in the packet may be formatted as analog or digital values, and the packet 400 may be transmitted via one or more of Amplitude Modulation (AM), Frequency Modulation (FM), or Phase Modulation (PM) in various frequency bands according to the standard selected for communication between the bots 100 and RCs 300.

The header 410 represents a portion of the packet 400 that is transmitted/received first in the packet 400. The header 410 may contain information related to the sender, the intended destination, the standard used to transmit the packet 400, a length of the packet 400, whether the packet 400 is one of a series of packets 400, error detection/correction information, etc. The device that receives the packet 400 may examine the header 410 to determine whether to read the payload 420 or ignore the packet 400. For example, a first bot 100a and a second bot 100b may both receive a packet 400 and analyze the header 410 to determine whether the packet 400 includes a payload 420 that the given bot 100 should execute.

The payload 420 includes the data, commands, and instructions In various embodiments, one packet 400 may be the payload 420 of another packet 400. For example, an RC 300 may transmit an outer packet 400 formatted according to a first standard with a payload 420 of an inner packet 400

In various aspects, and depending on the format used for the packet 400, the footer 430 may be omitted.

Figure 5A:
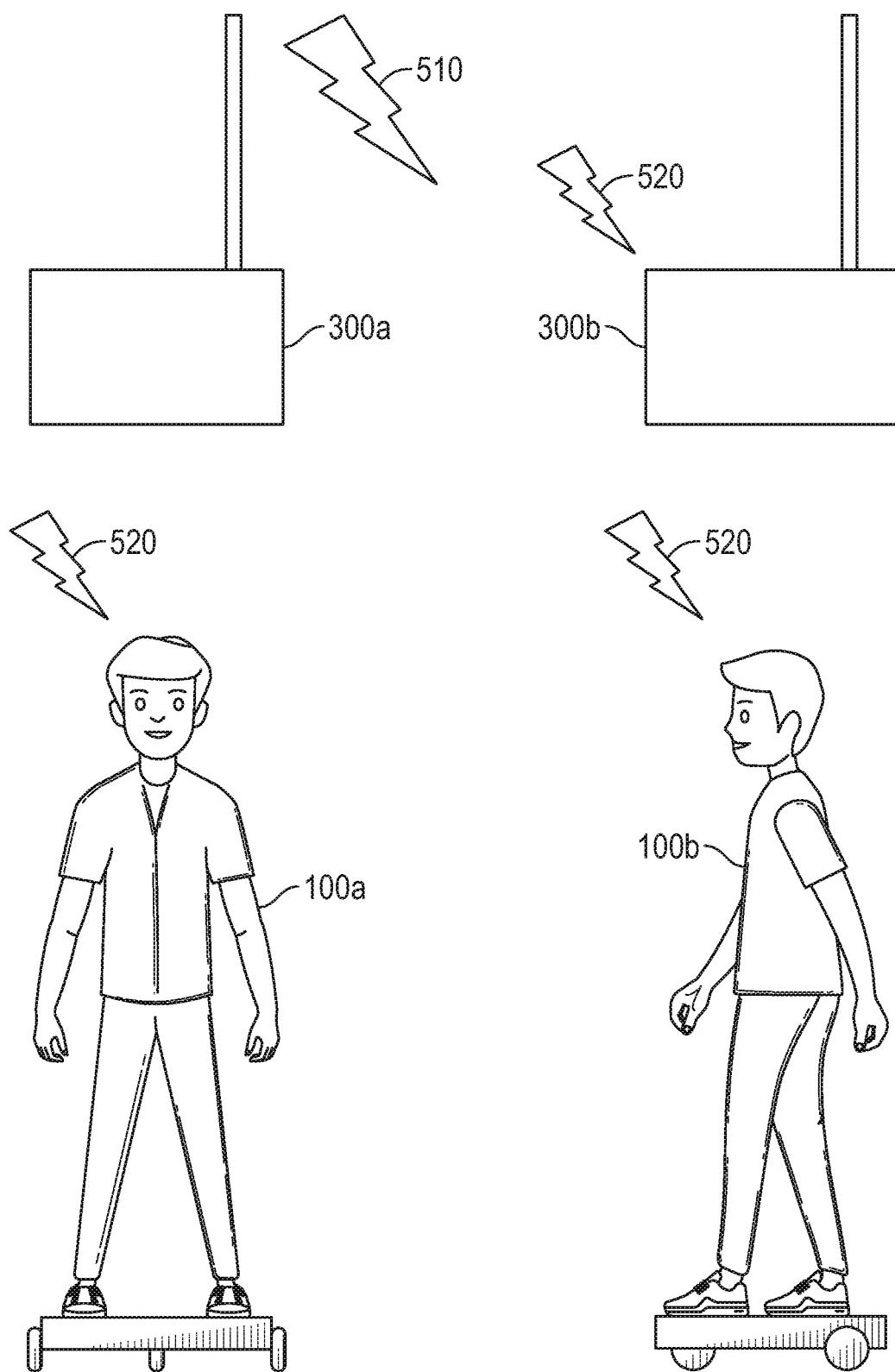
FIGS. 5A and 5B illustrate various examples scenes in which several robotic action figures and remote controllers are interacting according to aspects of the present disclosure.
Figure 5B:
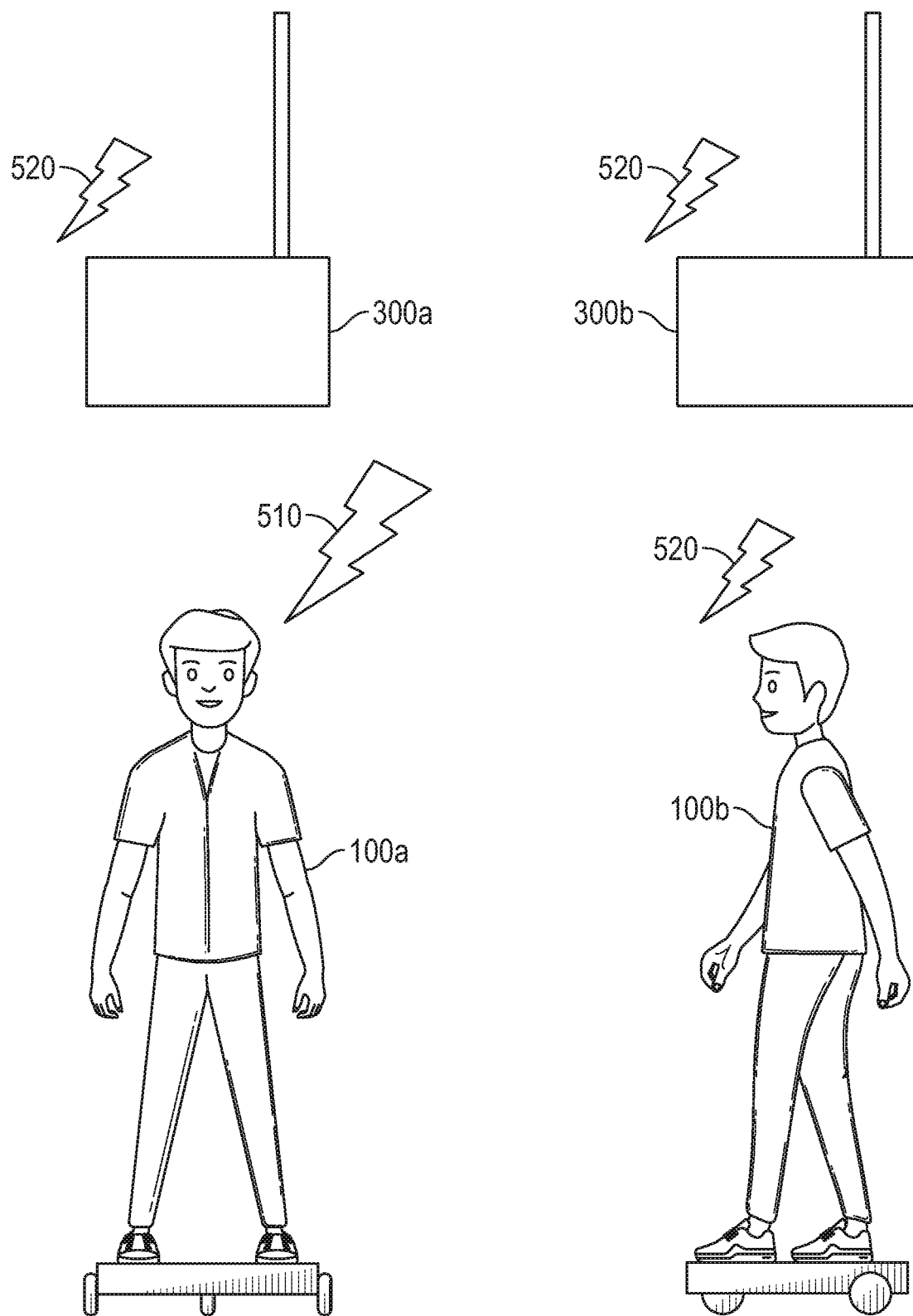

FIGS. 5A and 5B illustrate various examples scenes in which several robotic action figures and remote controllers are interacting. Each bot 100 in the example scenes is associated with a corresponding RC 300 as the primary RC 330 for that bot 100. In various embodiments, each RC 300 and each bot 100 may send and receive various signals that may be intended for one specific target, intended for several targets, or intended for all targets. In various embodiments, the signals from multiple bots 100 or RCs 300 may be distinguished from one another by one or more of Frequency Division Multiplexing (FDM), Time Division Multiplexing (TDM), and/or information in the header 410 that identifies the transmitter and intended receiver. The messages may be encoded onto the various signals by one or more of Amplitude Modulation, Frequency Modulation, or Phase Modulation of the signal.

A message transmitted from a given bot 100 or a given RC 300 may be received by various other bots 100 or RCs 300. As used herein, the bots 100 or RCs 300 that receive the signal and successfully extract the message from the signal are referred to as "in range" (and variations thereof) of the transmitting device. A device may use one or more of a signal strength, a checksum, or a message format to determine whether the message has been successfully extracted from the signal. When using multiple devices, not all devices need to be in range of one another for the devices to interact. For example, a first bot 100a and a second bot 100b may both be in range of a first RC 300a and a second RC 300b and may interact with one another without needing the first RC 300a and the second RC 300b to be within range of each other. Individual in-range devices may act as repeaters for devices out of range of one another (i.e., re-transmitting the message received from a first transmitter to reach devices out of range of the first transmitter but in range of the repeater device) or devices out of range of one another may operate independently of the signals from out of range devices.

Several devices may be in range of a transmitting device, and may determine whether to execute or ignore any instructions included in the message. For example, with a first bot 100a, a second bot 100b, and a second RC 300b all in range of a first RC 300a, the first bot 100a may execute instructions included in a message from the first RC 300a while the second bot 100b and the second RC 300b may ignore the message. A receiving device may determine whether to execute or ignore a message based on one or more of: an identifier in the header 410 of a packet 400 of the message (identifying a sender, an intended receiver, or a message type), a time at which the message was received, a frequency of the signal used to transmit the message, or the like.

In FIG. 5A, a first RC 300a is associated as the primary controller for a first bot 100a, and a second RC 300b is associated as the primary controller for a second bot 100b. The first RC 300a is shown as a transmitting device that generates a generated signal 510. The generated signal 510 is received as a received signal 520 at each of the first bot 100a, the second bot 100b, and the second RC 300b. The generated signal 510 may include one or more packets 400 that include various messages for the various devices that receive the command signal 510. For example, the generated signal 510 may be a move command from the first RC 300a to the paired first bot 100a to move within the environment. In another example, the generated signal 510 may be a broadcast signal that is intended to identify the first RC 300a to the other devices in the environment. The generated signal 510 transmitted by the first RC 100a may be intended for one bot 100, for multiple bots 110n, for one RC 300, for multiple RCs 300n, for one paired RC 300 and bot 100, or for all RC 300 and all bots 100.

In FIG. 5B, a first RC 300a is associated as the primary controller for a first bot 100a, and a second RC 300b is associated as the primary controller for a second bot 100b. The first bot 100a is shown as a transmitting device that generates a generated signal 510. The generated signal 510 is received as a received signal 520 at each of the first RC 300a, the second bot 100b, and the second RC 300b. The generated signal 510 may include one or more packets 400 that include various messages for the various devices that receive the command signal 510. For example, the first bot 100a may transmit telemetry or sensor data from a sensor suite 130 to the paired first RC 300a to update the first RC 300a for a status of the first bot 100a. In another example, the first bot 100a may re-transmit a generated signal 510 received from the first RC 300a, thereby acting as a repeater device. In a further example, the first bot 100a may transmit the generated signal 510a to alert nearby devices of a condition of the first bot 100a (e.g., entering the environment, health-points in a game, command confirmation).

Figure 6:
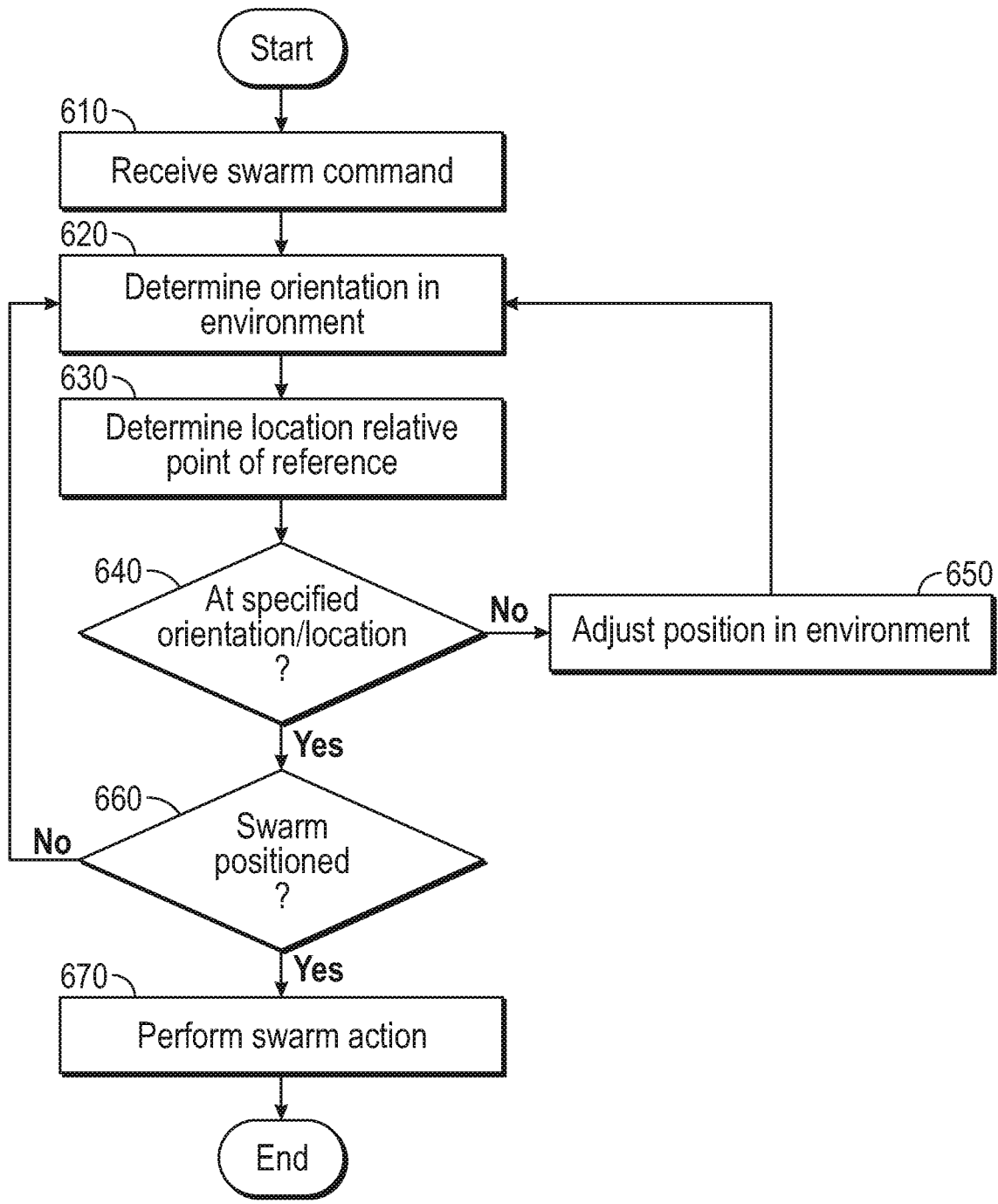
FIG. 6 illustrates a method for synchronized robot orientation according to aspects of the present disclosure.

FIG. 6 illustrates a method for synchronized robot orientation. Method 600 begins with block 610, where a bot 100 receives a swarm command. The swarm command is a command generated by an RC 300 or a bot 100 that affects several bots within range of one another to perform a coordinated task. In some embodiments, the swarm command may be retransmitted between devices in the environment to expand the range of the signal from the initial transmitting device to include the transmitting range of each of the devices (e.g., bots 100 and RCs 300) in range of at least one other device in the swarm.

The swarm command may specify an orientation in the environment, a shared point of organization for each bot 100 that receives the swarm command to use, an inter-bot distance between other bots 100 for each individual bot 100 to maintain, a distance from a shared point of organization for each bot 100 to use, an identifier for whether a given bot 100 in the environment should consider itself part of a given swarm (e.g., is the swarm command for a first set of bots 100 on the red team or for a second set of bots 100 on the blue team), actions for the bots 100 in the swarm to take in concert once organized (i.e., swarm actions), actions for specific bots 100 in the swarm to take once organized, whether a given bot 100 of the bots 100 in the swarm has a particular role in the swarm (e.g., a first bot 100a may be designated as a shared point of organization) or specific tasks to perform once organized, and the like. The swarm command may include locations and/or patterns in the environment that the bots 100 should be located (relative to one another and/or a shared point of reference), as well as orientations that the bots 100 should be pointed. For example, swarm commands may indicated that two teams of bots 100 may be located within X cm of each member of the team that the bot 100 belongs to, within Y cm from a half-court line of a play field that the teams of bots 100 are located on, and that bots 100 on the red team are oriented with fronts 130 pointed northward and bots 100 on the blue team are oriented with fronts 130 pointed southward.

The swarm command may be transmitted from an RC 300 associated as the primary controller for each of the bots 100 within the swarm, an RC 300 associated with one bot 100 in the swarm, or an RC 300 designated as a swarm command coordinating RC 300. For example, a first RC 300a may be associated as the primary controller for a first bot 100a and one or more other bots 100n. In another example, a first RC 300a that is associated with a first bot 100a, may issue a swarm command to the first bot 100a and a second bot 100b that is associated with a second RC 300b. In a further example, each bot 100n in the swarm may be associated with a designated RC 300n, and additional RC 300 is designated for transmitting swarm commands (e.g., an RC 300 for a "referee" user that is not individually associated with any of the "player" bots 100).

At block 620, the bot 100 determines how the bot 100 is orientated in the environment. In various embodiments, the bot 100 queries the accelerometer 232, gyro 233, and magnetometer 231 to determine a yaw, pitch, & roll orientation for the bot 100 based on a deviation of the bot 110 from magnetic north (or another magnetic field lines for a magnetic field in the environment) and gravity. One exemplary implementation to determine the orientation of a bot 100 is to use a complimentary filter or a fixed gain Kalman filter that accepts magnetometer data for yaw correction. Each bot 100 in the swarm that acts on the swarm command may periodically query the included accelerometer 232, gyro 233, and magnetometer 231 to determine an individual orientation, or may share orientation data with other bots 100 in the swarm (e.g., via the RC 300) to use a composite dataset for the orientation data from several bots 100 in the environment.

At block 630, the bot 100 determines where the bot 100 is located in the environment relative to a point of reference. In various embodiments, cameras, range finders, or infrared transmitters/receivers that are part of the sensor suite 230 of the bot 100 identify a distance, identity, and/or bearing of objects in the environment relative to the bot 100. In embodiments where the bot 100 navigates three-dimensional space, an altimeter may provide location data for an altitude relative to sea level or a starting surface. The bot 100 may rotate about an axis to determine where various objects (including other bots 100) are located relative to the bot 100, or may remain in place and determine where objects are in the environment within a field of view for the given sensors used. The point of reference may be a designated bot 100, a designated feature in the environment, a center point of the bots 100 relative to one another that is determined ad hoc by the bots 100 in the swarm, or the like. In other implementations, the determination of the location of the bots 100 may be ignored or skipped and only the orientation data are used. For example, a null location supplied for the point of reference or the specified location may indicate to the bot 100 that a current location of the bot 100 matches the specified location regardless of where the bot 100 is located in the environment.

At block 640, the bot 100 determines whether the bot 100 is positioned according to the specified orientation and/or location in the environment. The bot 100 compares the current orientation for the bot 100 in the environment (determined per block 620) and the current location for the bot 100 in the environment (determined per block 630) against the respective specified orientation and specified location for the bot 100 in the environment included in the swarm command (per block 610). If the bot 100 determines that the bot 100 is not positioned such that the current orientation matches the specified orientation and that the current location matches the specified location, method 600 proceeds to block 650. If the bot determines that the bot 100 is positioned such that the current orientation matches the specified orientation and that the current location matches the specified location, method 600 proceeds to block 660.

At block 650, the bot 100 adjusts where in the environment the bot 100 is positioned. When a bot 100 adjusts position in the environment, the bot 100 may activate one or more motors 260 to move the bot 100 to a new location in the environment and/or adjust a point of articulation on the bot 100 (e.g., raising an arm, rotating a head/neck joint, adjusting the bot 100 from a prone to a standing posture). Depending on the available points of articulation in the bot 100, the method of locomotion employed by the bot 100, and which of the location and/or orientation of the bot 100 does not match the specified location/orientation, adjusting one of the current location or orientation of the bot 100 may affect the other of the location or orientation. Additionally, several bots 100 may simultaneously attempt to adjust associated positions within the environment, which may lead to adjustments made by one bot 100 affecting the position of another bot 100. Therefore, once a bot 100 has adjusted where that bot 100 is located in the environment and/or how that bot 100 is oriented in the environment, method 600 updates the environmental knowledge of the bot 100 by returning to block 620 and block 630.

At block 660, the bot 100 determines whether each bot 100 in the swarm is in position. When a particular bot 100 is at the specified orientation and at the specified location (per block 640), the bot 100 may transmit an in-position signal to the other bots 100 and/or the RC 300 that the particular bot 100 is in-position. The bot 100 may determine that the swarm is in position when all of the bots 100 are transmitting an in-position signal, or in response to an in-position signal from the RC 300. If the bot 100 determines that all of the other bots 100 in the swarm with the bot 100 are also in position, method 600 proceeds to block 670. Because a particular bot 100 may be in-position before other bots 100 in the swarm are in position, the particular bot 100 may wait at the current position until the swarm is positioned. The particular bot 100 may return to blocks 620, 630m and 640 of method 600 while waiting to verify that the movement of the other bots 100 have not affected the particular bot 100 to be out of position within the swarm (i.e., whether the particular bot 100 remains at the specified orientation and location).

At block 670, the bot 100 performs, in concert with the other bots 100 in the swarm, a swarm action. The swarm action may be included in the original swarm command or in a subsequent command. In one example, the swarm action releases the bot 100 to receive commands from a player RC 300 after a swarm command from a referee RC 300 positions several bots 100 into match-start positions (e.g., bots 100 of race-cars are aligned with a starting line). In another example, the swarm command specifies a unified action for each bot 100 in the swarm to perform at the same time (e.g., all the bots 100 spin in place three times once the swarm is in position). In a further example, the swarm command specifies a choreographed action for the bot 100 to perform in concert with other choreographed actions for the other bots 100 to perform (e.g., the swarm is aligned to perform a dance routine with individual bots 100 taking coordinated actions at different times). A choreographed action may specify various bots 100 in the swarm to be in different positions and take actions based on the identity of the bot 100 and/or a relative position in the swarm. For example, in a line of bots 100, the action may raise the arms of a first bot 100a at time $t_1$, raise the arms of a second bot 100b positioned to the right of the first bot 100a at time $t_2$, raise the arms of a third bot 100c positioned to the right of the second bot 100b and lower the arms of the first bot 100a at time $t_3$, raise the arms of a fourth bot 100d positioned to the right of the third bot 100c and lower the arms of the second bot 100b at time $t_4$, etc. to produce a choreographed "wave" through the bots 100. Method 600 may then conclude.

FIGS. 7A-E illustrate example top-down views of scenes of several robotic action figures acting in concert in association with a shared orientation. In each of the example scenes, a first bot 100a, a second bot 100b, and a third bot 100c are shown as part of a swarm reacting to a swarm command sent by an RC 300. Other examples in which more or fewer bots 100 are included in a swarm, and where more or fewer RCs 300 are in range of the swarm are envisioned.

The environment illustrated in FIGS. 7A-E includes a shared reference point 710. In some embodiments, more than one reference point 710 may be present, such as, for example, the four in-bounds lines of a square playing field for a game, and separate positional information may be based off of the different reference points 710. The reference point 710 may include static physical features in the environment that each bot 100 may identify with an associated sensor suite 230 (e.g., a camera, a radio/infrared beacon receiver). In other embodiments, the reference point 710 may include mobile features within the environment that at least one bot 100 may identify with an associated sensor suite 230. For example, the first bot 100a and the second bot 100b may set the third bot 100c as a master bot 100 (i.e. as a mobile reference point 710) to base positional information from. In further embodiments, a conceptual feature in the environment may be set that each bot 100 may identify with input from an outside RC 300 or bot 100. For example, a user may place several bots 100 at different locations within the environment that the bots 100 are instructed to use as a starting location, which the bots 100 may retain in memory for the purpose of performing swarm actions. In another example, several bots 100 in a swarm may aggregate locational and orientation information as part of the swarm to perform actions relative to a center of the swarm, which may update as the bots 100 move within the environment and relative to one another.

Figure 7A:
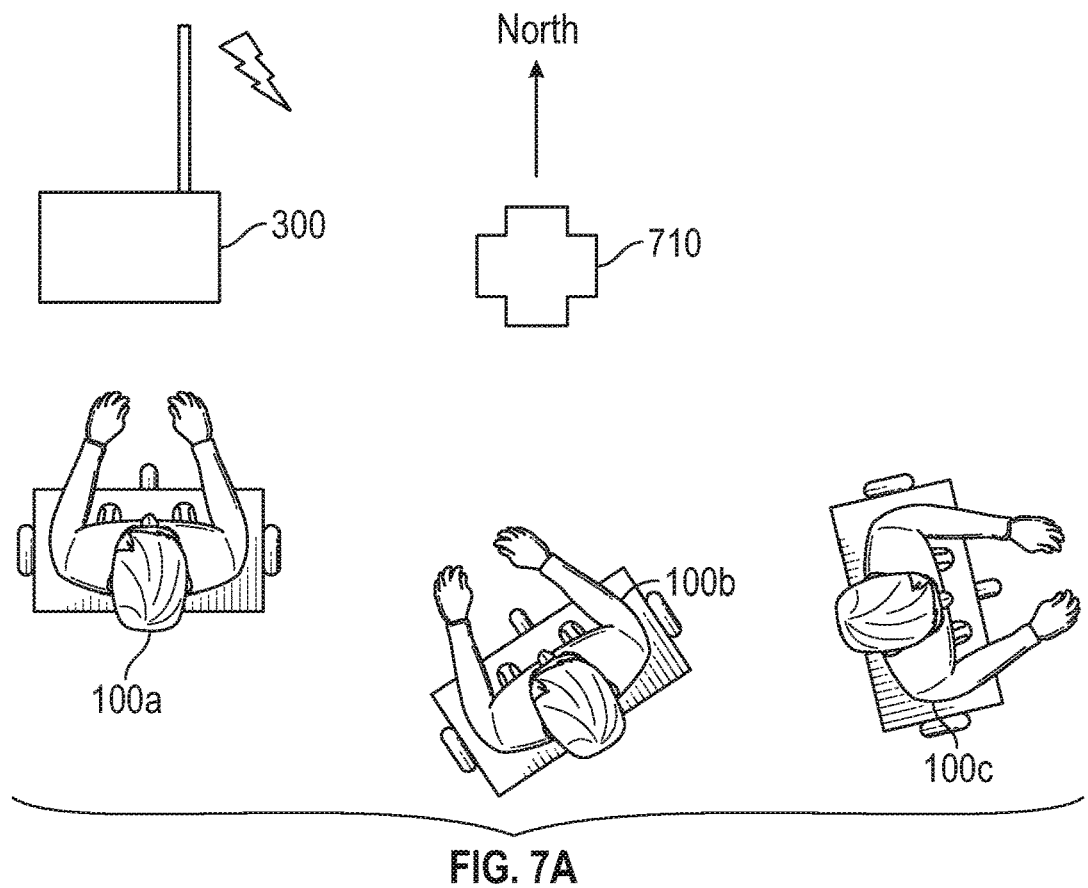
FIGS. 7A-E illustrate example top-down views of scenes of several robotic action figures acting in concert in association with a shared orientation according to aspects of the present disclosure.

In FIG. 7A, the three bots 100 are shown at various locations and orientations in the environment that are not co-aligned with one another or any particular feature or orientation in the environment.

Figure 7B:
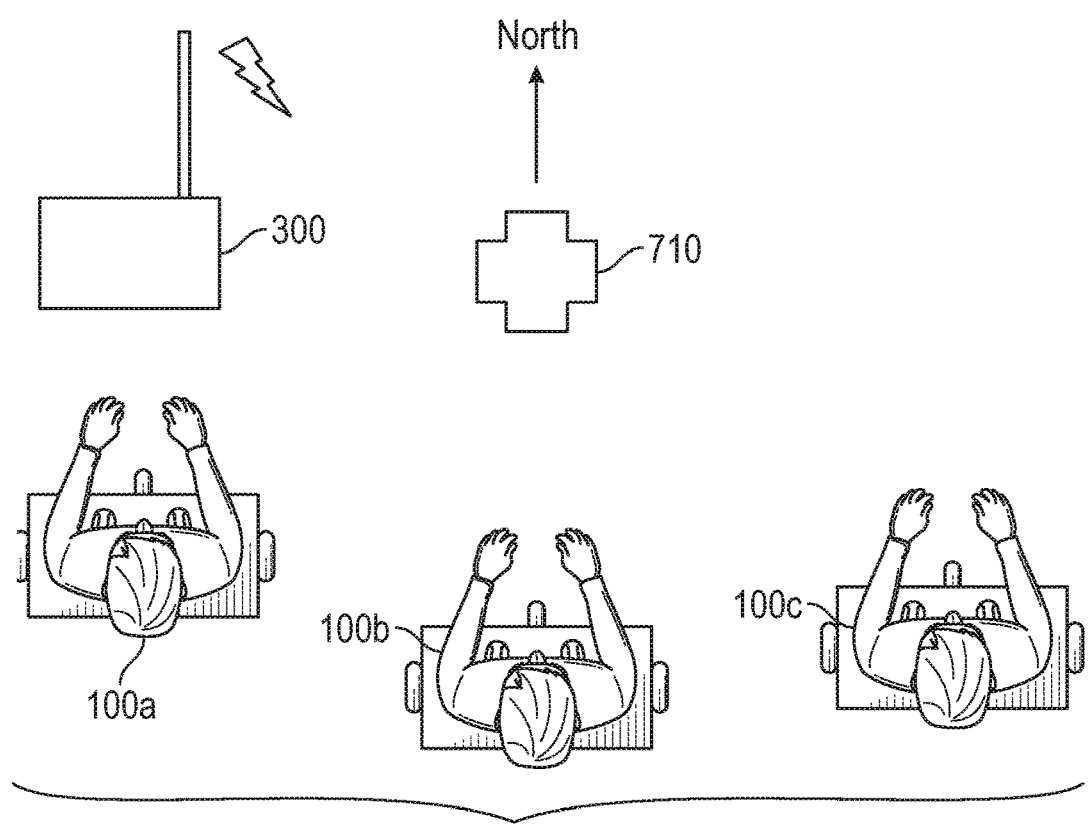

In FIG. 7B, each of the three bots 100 are shown at various locations in the environment, and all three bots 100 are shown as being oriented with faces 130 pointed northward. The bots 100 of FIG. 7A may rotate or reorient themselves to the shared orientations shown in FIG. 7B based on data from the accelerometer 232, gyro 233, and/or magnetometer 230, for example using the Earth's magnetic field to orient relative a magnetic pole and gravity. In other embodiments, orientation data may be collected by other sensors in the sensor suite 230 of each bot 100 to ensure that each bot 100 in the swarm is properly aligned according to a specified orientation. For example, an environment set in an arena may provide IR signals to the bots 100 by which the bots 100 are oriented. In another example, known a landmarks or signs in the environment may be identified by a camera, and the bot 100 may orient relative to the landmark or sign. In a further example, a bot 100 may orient relative to a conceptual or physical reference point 710 (e.g., a swarm of bots 100 may orient to face inward to a circle defined around a reference point 710).

Figure 7C:
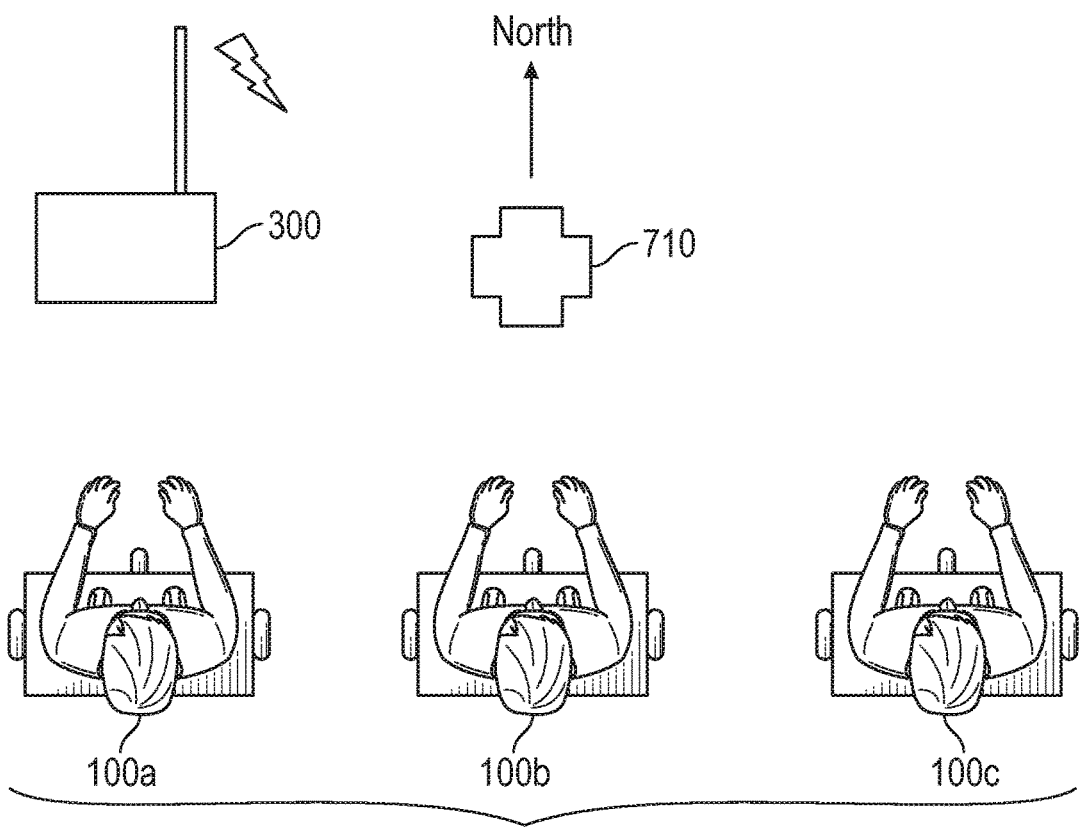

In FIG. 7C, each of the three bots 100 are shown in aligned locations in a straight line with an even amount of space between each neighboring pair of bots 100. Depending on the number of bots 100 in the swarm and the reference point(s) 710 used for location setting, different patterns, groupings, and spacings for the bots 100 in the swarm are possible.

The location of each bot 100 is determined so that the bot 100 may position itself in a specified location within the environment relative to one or more reference points 710. The specified location relative to a reference point 710 may include a minimum distance, a maximum distance, a distance range, a variable distance based on a number of bots 100 in the swarm, and/or specific coordinates in the environment. The each bot 100 may determine a location in the environment relative to a reference point 710 via an actuation sensor (e.g., a push button that is depressed by contact with a reference point 710), an IR transmitter/receiver, a rangefinder, a camera, or the like.

Figure 7D:
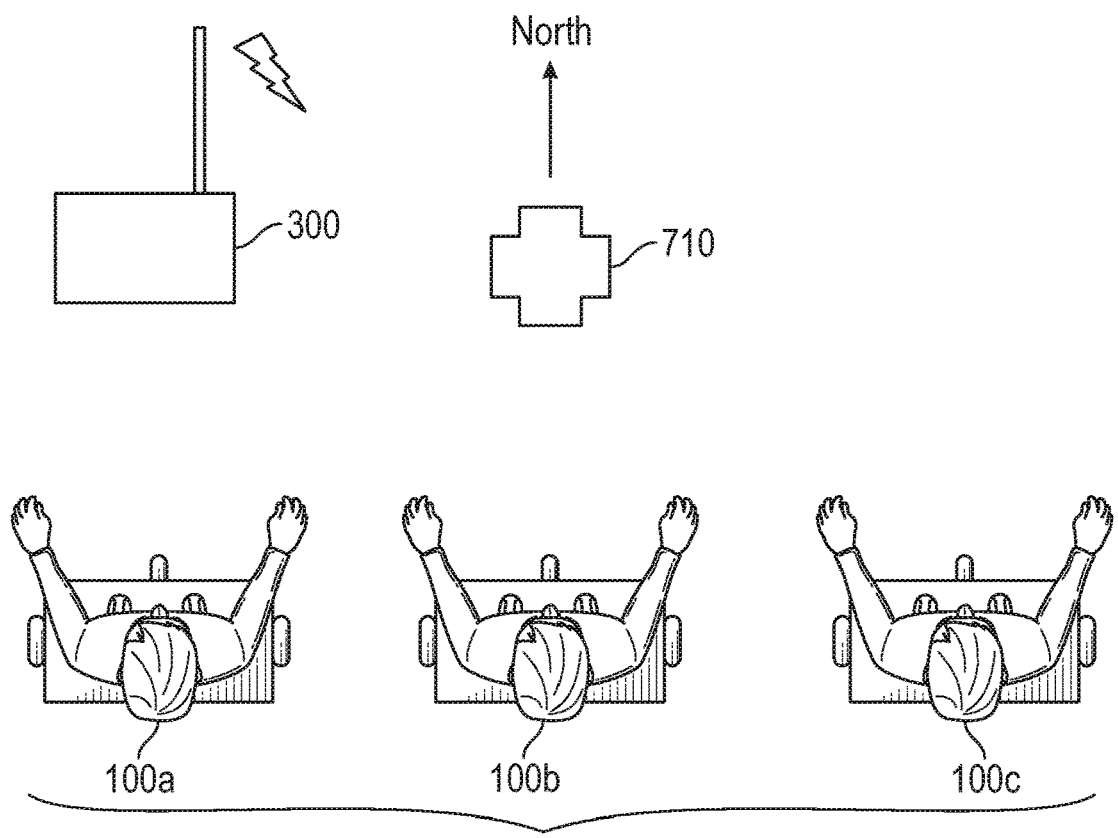

In FIG. 7D, the three bots 100 are taking a unified swarm action from the bots 100 illustrated in FIG. 7C; extending the arms of each bot 100 at the same time. In other implementations the unified swarm action may be synchronized pivoting, turning, advancing, retreating, etc. A unified swarm action may be specified in a swarm command so that each bot 100 in the swarm takes the same class of action at approximately the same time. For example, a unified swarm action to "sound off" or identify each bot 100 in the swarm may result in each bot 100 playing a different sound clip at the same starting time that recites a catch-phrase or identity of a character embodied by the bot 100.

Figure 7E:
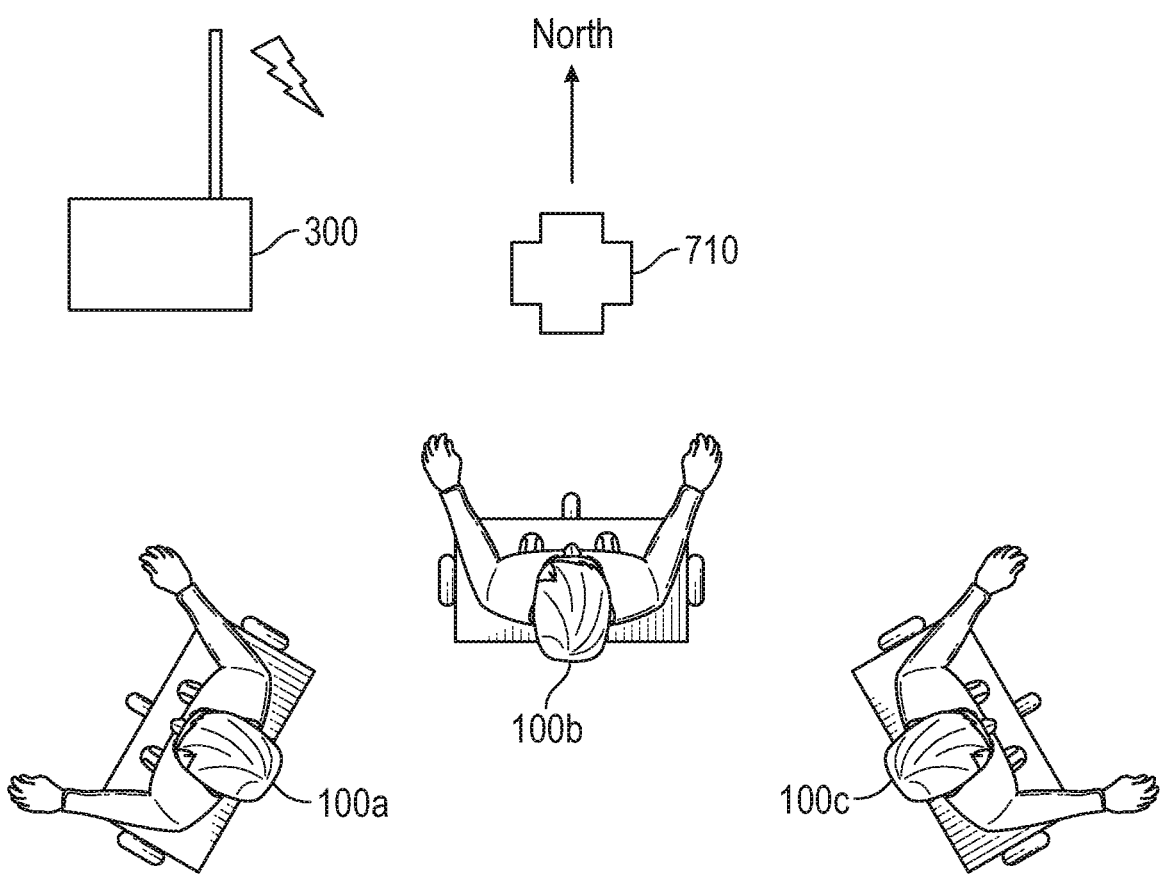

In FIG. 7E the three bots 100 are taking a unified swarm action from the bots 100 illustrated in FIG. 7D; each bot 100 is moving or performing an action as a choreographed swarm, but may differ in time and/or class from the actions taken by the other bots 100 in the swarm. For example, once the bots 100 are oriented and located as part of a coordinated swarm, the actions of each bot 100 may be controlled individually based on the identity of the bot 100 and/or a position of the bot 100 in the swarm. In the illustrated example, relative to the positions illustrated in FIG. 7D, the first bot 100a has rotated counter-clockwise, the second bot 100b has advanced towards the reference point 710 without rotation, and the third bot 100c has rotated clockwise. Several choreographed actions may be taken in succession, and may be combined with various unified actions, so that the individual bots 100 in the swarm are coordinated in movements relative to one another and the environment.

Figure 8A:
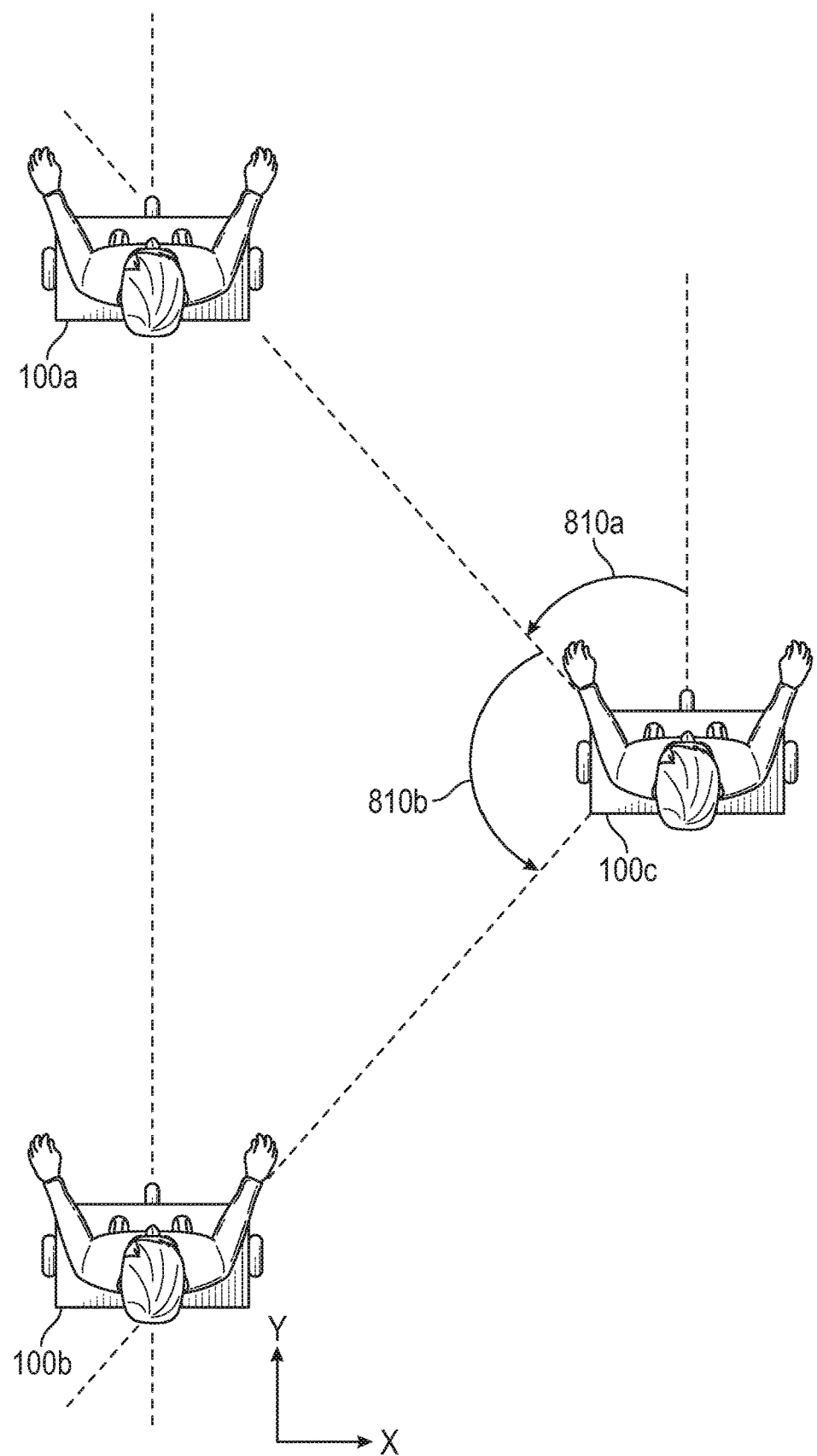
FIGS. 8A and 8B illustrate example top-down views of scenes of several robotic action figures acting in concert in to arrange the swarm into a formation.
Figure 8B:
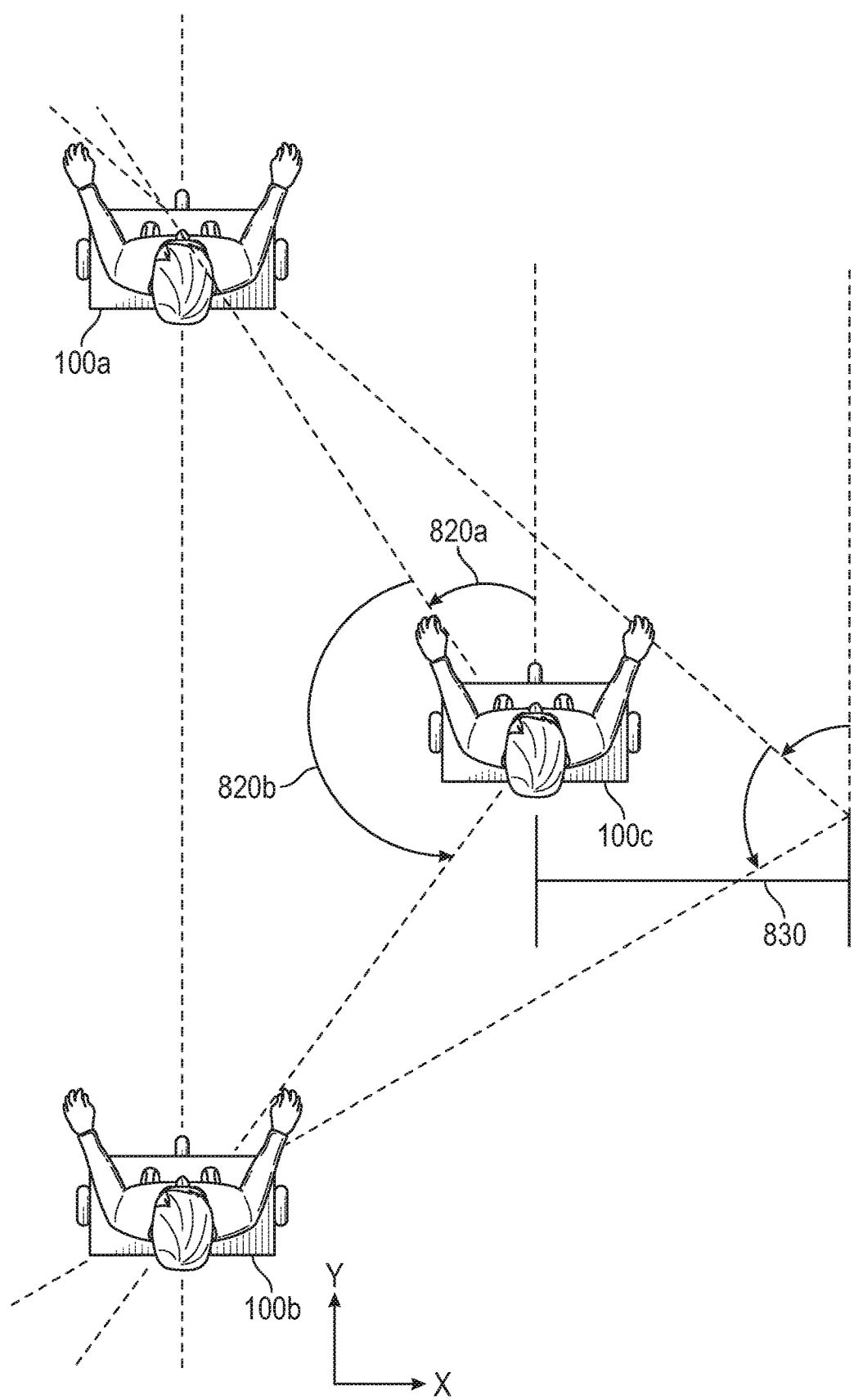

FIGS. 8A and 8B illustrate example top-down views of scenes of several robotic action figures acting in concert in to arrange the swarm into a formation. In each of the example scenes, a first bot 100a, a second bot 100b, and a third bot 100c are shown as part of a swarm reacting to a swarm command sent by an RC 300. Other examples in which more or fewer bots 100 are included in a swarm, and where more or fewer RCs 300 are in range of the swarm are envisioned. Additionally, although the current example is provided for a swarm of bots 100 self-orienting in one plane, a swarm of bots 100 including a least one bot 100 capable of three-dimensional movement (e.g., a drone style bot 100) may organize into formations with positions for each bot 100 set in several planes.

In FIG. 8A, the three bots 100a-c that form the illustrated swarm begin the process of falling into formation by rotating so that at least two bots 100 recognize one another within the swarm. In various aspects, all of the bots 100 in a swarm may rotate simultaneously to identify another bot 100, while in other aspects, two bots 100 are designated to rotate to locate one another as a basis line for the formation and other bots 100 are later rotated to join the formation begun (and added to) by earlier-rotated bots 100. The bots 100 may communicate within the swarm via IR codes and/or a BLE network to identify which other bots 100 a given bot 100 has identified. In various embodiments, the bots 100 rotate in place (e.g., change orientation without changing location) to find one another, while in other embodiments the bots 100 may move about the environment when attempting to location other bots 100. Once a particular bot 100 has joined the formation, that bot 100 may signal an RC 300 and/or the other bots 100 in the swarm that the particular bot 100 is in position so that a next bot 100 in the swarm may begin to join the formation.

In the illustrated example in FIG. 8A, the first bot 100a and the second bot 100b have already rotated and discovered one another. The first bot 100a and the second bot 100b form a starting line against which other bots 100 may join the formation. The bots 100 may recognize one another by various sensors and I/O devices 270, such as, for example, an IR transmitter and IR receiver pair, a camera, a range finder, etc. In various embodiments, the starting bots 100 (e.g., the first bot 100a and the second bot 100b) may rotate to a shared orientation or move to a predefined distance relative to one another or a reference point 710 in the environment after locating one another. In various aspects, the I/O devices 270 used to judge distances when creating a formation of bots 100 may include range finders, calibrated I/R transmitters/receivers (to correlate signal strength with distance), wireless signals carrying timing information (for time-of-flight calculations), and the like.

To join the formation begun by the first bot 100a and the second bot 100b, the third bot 100c in FIG. 8A rotates until the first bot 100a and the second bot 100b are identified. The third bot 100c determines a first rotational angle 810a to the first bot 100a and a first rotational angle 810b to the second bot 100b relative to a shared point of orientation (e.g., magnetic north, a reference point 710). The third bot 100c then proceeds, as is illustrated in FIG. 8B, to move to a new location in the environment (closer to or further from the other bots 100 in the formation), and rotates until the first bot 100a and the second bot 100b are identified again from the new location. The third bot 100c determines a second rotational angle 820b to the first bot 100a and a second rotational angle 820b to the second bot 100b relative to a shared point of orientation (e.g., magnetic north, a reference point 710).

The third bot 100c, as part of the command to join the formation, knows the predefined distance between the first bot 100a and the second bot 100b, and the distance travelled 830 from the first location (in FIG. 8A) to the second location (in FIG. 8B) in the environment, and may therefore calculate a distance between the third bot 100c and the first bot 100a and a distance between the third bot 100c and the second bot 100b. The third bot 100c may track the distance traveled 830 linearly (e.g., 5 cm) and/or in association with a coordinate system for the environment (e.g., −4 cm in X direction, +3 cm in Y direction).

The third bot 100c may continue to move to new locations in the environment until the distance between the third bot 100c and the first bot 100a matches a predefined distance for the formation and the distance between the third bot 100c and the second bot 100b matches a predefined distance for the formation. In additional embodiments, third bot 100c may continue to move to new locations in the environment until the angle of rotation between the third bot 100c and the first bot 100a matches a predefined angle for the formation and the angle of rotation between the third bot 100c and the second bot 100b matches a predefined angle for the formation.

In examples using more than three bots 100, the fourth and later bots 100 to join the formation may identify two bots 100 that have already joined the formation from which to base determinations of distance and/or angle, or may identify more than two bots 100 that have already joined the formation as basis points for joining the formation. In examples that form three-dimensional formations, three bots 100 may define a plane, against which fourth and later bots 100 may self-orient via three angles/distances to the respective three bots 100 defining a plane.

In the present disclosure, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, from a remote control device at a given robotic device in a plurality of robotic devices, a swarm command, the swarm command including a specified orientation and a specified location, wherein the swarm command is received by each robotic device of the plurality of robotic devices and wherein the given robotic device is not designated as a master device in the plurality of robotic devices;
   determining, by the given robotic device, a current orientation of the given robotic device in an environment, based at least in part on a magnetometer indicating an alignment deviation of the given robotic device from a magnetic field direction and an accelerometer and a gyroscope indicating an alignment of the given robotic device relative to gravity;
   determining, by the given robotic device, a current location of the given robotic device relative to a reference point in the environment; and
   in response to determining that at least one of the current orientation of the given robotic device does not match the specified orientation and the current location of the given robotic device does not match the specified location, adjusting a position of the given robotic device to affect at least one of the current orientation and the current location.

2. The method of claim 1, further comprising, in response to determining that the current orientation of the given robotic device matches the specified orientation and the current location of the given robotic device matches the specified location, and when each robotic device of the plurality of robotic devices is positioned according to the specified orientation and the specified location, performing a swarm action included in the swarm command.

3. The method of claim 2, wherein the given robotic device transmits an in-position signal in response to determining that the current orientation of the given robotic device matches the specified orientation and the current location of the given robotic device matches the specified location.

4. The method of claim 1, wherein the given robotic device executes a swarm action in the swarm command in parallel with other robotic devices of the plurality of robotic devices.

5. The method of claim 1, further comprising:
determining a given starting location for the given robotic device in the environment for use as the reference point for the given robotic device, wherein a second robotic device in the plurality of robotic devices uses a second stating starting location for the second robotic device in the environment as a corresponding second reference point for performing the swarm command.

6. The method of claim 1, wherein the given robotic device uses tracks, legs, or wheels for locomotion.

7. A non-transitory computer-readable storage medium having computer-readable program code for synchronizing robot orientation that when executed by a processor, enable the processor to:
receive, from a remote control device at a given robotic device in a plurality of robotic devices, a swarm command, the swarm command including a specified orientation and a specified location, wherein the swarm command is received by each robotic device of the plurality of robotic devices and wherein the given robotic device is not designated as a master device in the plurality of robotic devices;
determine, by the given robotic device, a current orientation of the given robotic device in an environment, based at least in part on a magnetometer indicating an alignment deviation of the given robotic device from a magnetic field line;
determine, by the given robotic device, a current location of the given robotic device relative to a reference point in the environment; and
in response to determining that at least one of the current orientation of the given robotic device does not match the specified orientation and the current location of the given robotic device does not match the specified location, adjust a position of the given robotic device to affect at least one of the current orientation and the current location.

8. The non-transitory computer-readable storage medium of claim 7, further comprising, in response to determining that the current orientation of the given robotic device matches the specified orientation and the current location of the given robotic device matches the specified location and when that each robotic device of the plurality of robotic devices is positioned according to the specified orientation and the specified location, perform a swarm action included in the swarm command.

9. The non-transitory computer-readable storage medium of claim 8, wherein the given robotic device transmits an in-position signal in response to determining that the current orientation of the given robotic device matches the specified orientation and the current location of the given robotic device matches the specified location.

10. The non-transitory computer-readable storage medium of claim 7, wherein the given robotic device executes a swarm action in the swarm command in parallel with other robotic devices of the plurality of robotic devices.

11. The non-transitory computer-readable storage medium of claim 7, wherein the reference point includes:
an inter-robotic device distance between the given robotic device and other robotic devices of the plurality of robotic devices; and
a shared point of organization.

12. The non-transitory computer-readable storage medium of claim 7, wherein the given robotic device executes a swarm action in the swarm command at a different time than another robotic device in the plurality of robotic devices as a choreographed swarm action.

13. The non-transitory computer-readable storage medium of claim 7, wherein the given robotic device further determines the current orientation of the given robotic device based on a gyroscope and an accelerometer indicating an alignment of the given robotic device relative to gravity.

14. A system, comprising:
a radio;
an accelerometer;
a gyroscope;
a magnetometer;
a motor;
a processor; and
a memory, including instructions that when executed by the processor, enable the system to:
receive, from a first remote control device via the radio, a swarm command, the swarm command including a specified orientation and a specified location for the system and other systems in a swarm, wherein the system is not designated as a master system for the swarm and each member of the swarm receives the swarm command from the first remote control device;
determine, by the system, a current orientation of the system in an environment, based at least in part on the magnetometer indicating an alignment deviation of the system from a magnetic field line;
determine, by the system, a current location of the system relative to a reference point in the environment; and
in response to determining that at least one of the current orientation of the system does not match the specified orientation and the current location of the system does not match the specified location, adjust a position of the system, via the motor, to affect at least one of the current orientation and the current location.

15. The system of claim 14, further comprising, in response to determining that the current orientation of the system matches the specified orientation and the current location of the system matches the specified location and when each system of the swarm is positioned according to the specified orientation and the specified location, performing a swarm action included in the swarm command.

16. The system of claim 15, wherein the system transmits, via the radio, an in-position signal in response to determining that the current orientation of the system matches the specified orientation and the current location of the system matches the specified location.

17. The system of claim 14, wherein the reference point includes:
an inter-robotic device distance between the system and the other systems of the swarm; and
a shared point of organization.

18. The system of claim 14, wherein the system executes a swarm action in the swarm command at a different time than another system in the swarm as a choreographed swarm action.

19. The system of claim 14, wherein determining the current orientation of the system in the environment, is further based on the gyroscope and the accelerometer indicating an alignment of the system relative to gravity.

20. The system of claim 14, wherein the swarm comprises a first set of systems that process the swarm command to perform a first swarm action and a second set of systems that process the swarm command to perform a second swarm action different than the first swarm action, wherein the first set of systems is associated with a second remote control device and is not associated with a third remote control device, wherein the second set of systems is associated with the third remote control device and is not associated with the second remote control device, and wherein the swarm command is received from the first remote control device that is associated with both the first set of systems and the second set of systems.

* * * * *

UNITED STATES PATENT AND TRADEMARK OFFICE
CERTIFICATE OF CORRECTION

PATENT NO. : 11,090,806 B2  
APPLICATION NO. : 16/104493  
DATED : August 17, 2021  
INVENTOR(S) : Nathan D. Nocon et al.

Page 1 of 1

It is certified that error appears in the above-identified patent and that said Letters Patent is hereby corrected as shown below:

In the Specification

Column 7, Line 49, delete "400" and insert -- 400. --, therefor.

Column 11, Line 7, delete "in-position" and insert -- in position --, therefor.

Column 11, Line 9, delete "in-position." and insert -- in position. --, therefor.

Column 11, Line 11, delete "in-position" and insert -- in position --, therefor.

Column 11, Line 12, delete "in-position" and insert -- in position --, therefor.

Column 11, Line 15, delete "in-position" and insert -- in position --, therefor.

Column 11, Line 19, delete "630m" and insert -- 630, --, therefor.

In the Claims

Column 17, Line 5, Claim 3, delete "in-position" and insert -- in position --, therefor.

Column 17, Line 19, Claim 5, delete "stating starting" and insert -- starting --, therefor.

Column 17, Line 62, Claim 9, delete "in-position" and insert -- in position --, therefor.

Column 18, Line 59, Claim 16, delete "in-position" and insert -- in position --, therefor.

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*